Nov. 25, 1969     F. M. POTTER     3,480,810

OIL COOLED GENERATOR

Filed June 5, 1968     2 Sheets-Sheet 1

INVENTOR.
*FREDERICK M. POTTER*
BY
*ATTORNEY*

INVENTOR.
FREDERICK M POTTER
BY
ATTORNEY

United States Patent Office 3,480,810
Patented Nov. 25, 1969

3,480,810
OIL COOLED GENERATOR
Frederick Milton Potter, Little Silver, N.J., assignor to The Bendix Corporation, a corporation of Delaware
Filed June 5, 1968, Ser. No. 734,728
Int. Cl. H02k 9/00, 9/20, 1/24
U.S. Cl. 310—54     8 Claims

ABSTRACT OF THE DISCLOSURE

An oil cooled generator which utilizes oil flowing in grooves in wedges between the poles of the rotor to cool the rotor windings. The grooves in the wedges are in turn fed through a channeled rotor shaft.

CROSS-REFERENCES TO RELATED APPLICATIONS

The present invention is an improvement over copending U.S. application Ser. No. 728,143 filed May 10, 1968, for oil cooled generator, by Frederick M. Potter, and assigned to the Bendix Corporation.

BACKGROUND OF THE INVENTION

Field of the invention

The invention relates to the field of dynamoelectric machines utilizing fluid as a cooling means.

Description of the prior art

The present invention is an improvement over those disclosed and claimed in U.S. Patent 3,260,872, copending U.S. application Ser. No. 580,648, filed Sept. 20, 1966, and copending U.S. application Ser. No. 728,143 filed May 10, 1968, all of which are assigned to The Bendix Corporation. Improved means are provided for cooling the rotor windings.

SUMMARY OF THE INVENTION

An oil cooled generator which uses oil flowing in channels around the housing, in the rotor and in wedges between the rotor windings to provide cooling.

DESCRIPTION OF THE PREFERRED EMBODIMENT

Figure 1:
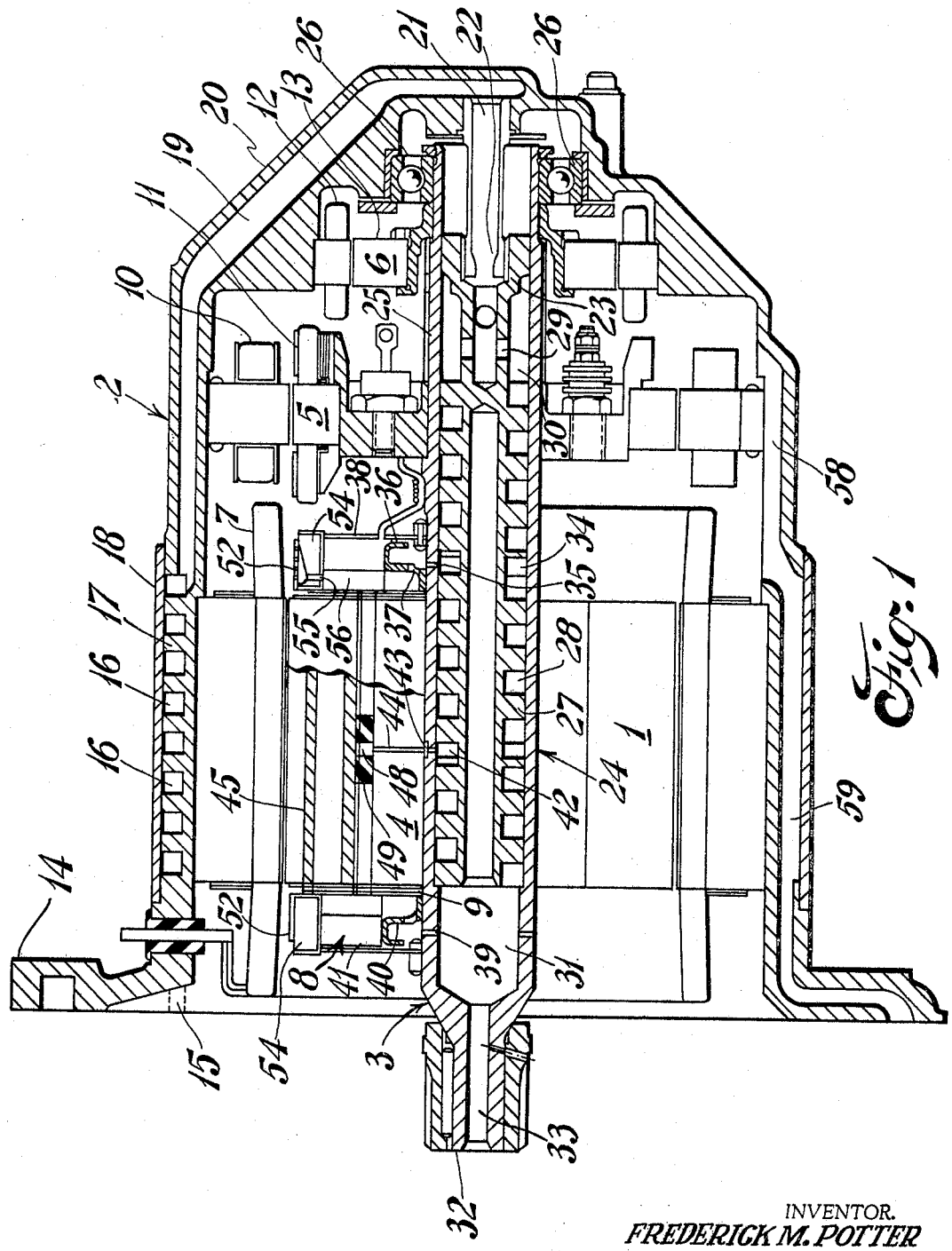
FIGURE 1 is a partial cutaway view of a dynamoelectric machine embodying the invention.

Referring now to the drawing, a dynamoelectric machine is indicated generally by the numeral 1 and, for example, is a generator. The generator 1 has a housing 2 and rotor 3 and for the purpose of illustration is shown as a brushless type having a main generator 4, exciter 5 and P.M. generator 6. The generator 4 has a stator winding 7 secured in the housing 2 in a suitable manner and a cooperating rotor winding 8 mounted on pole laminations 9 which are mounted on the rotor 3. In like manner, the exciter 5 has a stator winding 10 secured in the housing 2 and a rotor winding 11 on the rotor 3. The P.M. generator 6 has a winding 12 secured in the housing 2 and a permanent magnet rotor 13 mounted on the rotor 3.

The housing 2 includes a mounting flange 14 adapted for attaching the generator 1 to a prime mover (not shown). The flange 14 has a channel 15, indicated by dashed lines, which is adapted to connect to an oil supply from a prime mover, such as a hydraulic constant speed drive. The channel 15 connects to parallel grooves 16 around the circumference of a section 17 of the housing 2. A cylindrical member 18 surrounds the section 17 and coacts with the grooves to form oil tight channels. The other end of the grooves 16 connects with a channel 19 of a flange section 20 of the housing 2. The channel 19 extends to and connects with a channel 21 in a sleeve type bearing 22. The channel 21 connects with a channel 23 in shaft 24 of the rotor 3. The shaft 24 includes an outer shaft 25 upon which the rotor windings 8, 10 and the P.M. rotor are mounted. The shaft 25 is mounted for rotation in the housing 2 by bearing 26. Fitted within the outer shaft 25 is an inner shaft 27 having spiral grooves 28 extending around the circumference thereof. The channel 23 connects by means of openings 29 in the inner shaft 27 to a chamber 30 formed between the shafts 25 and 27. The spiral grooves 28 connect at one end to the chamber 30 and at the other end to a chamber 31. The shaft 25 terminates in a spline section 32 adapted to mate with a driving source (not shown) for example, a constant speed drive. The section 32 has a channel 33 which extends from the chamber 31 and is adapted to connect with a corresponding channel in the driving source (not shown).

Also the inner shaft 27 has a circumferential groove 34. In register with the groove 34 are a plurality of small openings 35, for example 0.02", in the outer shaft 25 spaced equally around the circumference thereof. In register with the openings 34 is a slinger 36 secured for rotation with the shaft 25. The slinger 36 has a plurality of slots 37 around the perimeter to permit the passage of oil as will be explained later. A baffle 38 of a suitable insulating material is provided adjacent to the slinger 36. Similar openings 39 are provided in the shaft 25 connecting into the chamber 31. A slinger 40 and baffle 41 are provided in like manner.

Figure 2:
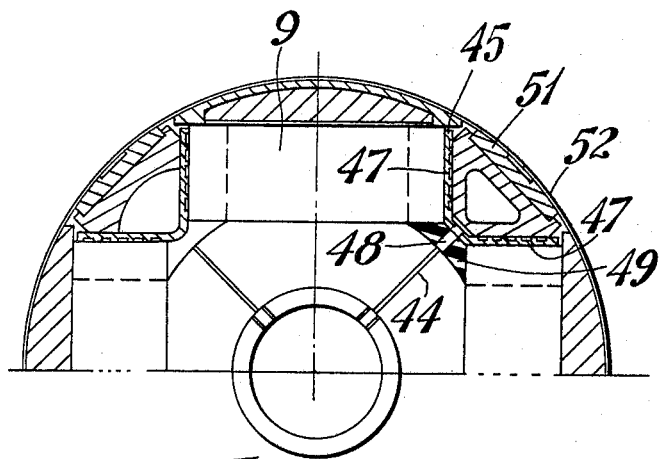
FIGURE 2 is a sectional view taken along the lines 2—2 of the machine of FIGURE 1.
Figure 3:
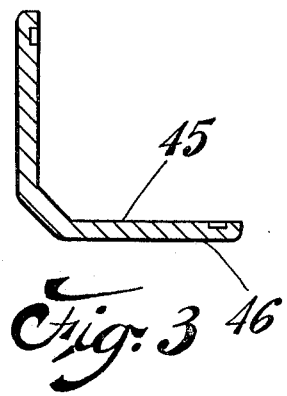
FIGURE 3 is a cross section view of a wedge utilized in the invention.
Figure 4:
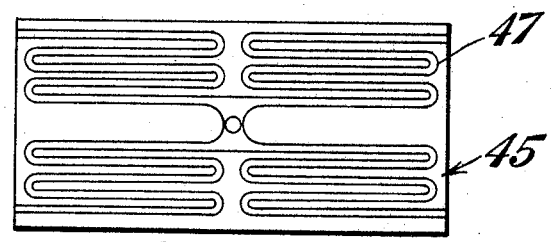
FIGURE 4 is a developed view of the wedge of FIGURE 3.

The inner shaft 27 has another circumferential groove 42 positioned to register with openings 43 in the outer shaft 25. The openings 43 are in register with a channel 44 extending through laminations 9 of the rotor winding 8, see FIGURE 2. An inner V-shaped wedge 45 has its outer surface coated with an insulation, for example an anodic hard coat 46, see FIGURE 3. The inner surface has a plurality of grooves 47, see FIGURE 4 for a developed view of the grooves 47. The inner wedge 45 is positioned between the individual pole windings and in intimate contact with the outer surface of the windings 8 on the laminations 9. A channel 48 is formed by insulation 49 connecting the channel 44 in the laminations 9 to the grooves 47 in the inner wedge 45.

Figure 5:
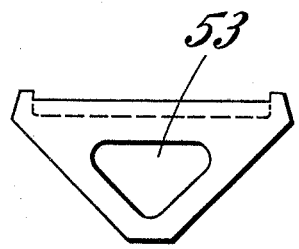
FIGURE 5 is a sectional view of a scraper utilized with the wedge of FIGURE 3.
Figure 6:
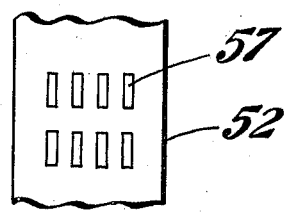
FIGURE 6 is a section view of a band utilized in the invention.

An outer wedge 50 is positioned into the inner wedge 45 so that the grooves 47 form a closed channel. The wedge 50 is maintained in position by spacer 51 and band 52. The wedges 45 and 50 may be of aluminum or other material having good heat conductivity. FIGURE 5 is an end view of the outer wedge 50 which has an opening 53 through the center. The end turns of the windings 8 are supported between the slingers 36, 40 and wedges 54 and are held in position by the bands 52. The wedges 54 have openings 55 connecting to the spaces 56 between the windings 8 and the laminations 9. The band 52 has a plurality of slots 57 in register with the openings 55 of the wedge 54, see FIGURE 6.

In the operation, the cooling fluid enters under pressure through the channel 15 in the mounting flange 14 and from there it flows through the grooves 16 in the housing 2 to the channel 19. From the channel 19 the fluid enters the shaft 25 through the channel 21 in the bearing 22 to the chamber 23. From the chamber 23 a small portion of the fluid feeds back between the bearing 22 and the inner shaft 27 to lubricate the bearing 26. The remainder of the fluid enters the spiral groove 28 through the openings 29. From the spiral groove 28 a portion of the fluid will exit through the opening 35 in the outer shaft 25 onto the slinger 36 where it will be forced through the opening 37 and sprayed on the windings 8. The baffle 38 keeps the fluid into contact with the windings 8.

As the fluid passes through the spiral channel 28, a portion will exit through the opening 43 in the shaft 25 and flow through the channel 44 in the laminations 9 to the grooves 47 in the inner wedge 45 and then out between the windings 8. The remainder of the fluid flowing in the spiral channel 28 enters the chamber 31 where a portion will exit through opening 39 onto the slinger 40 in the same manner as explained for the slinger 36. The remainder of the fluid passes through the channel 33 into the constant speed drive.

The fluid from the slinger 36 and 40 and also that from the inner wedge 55 passes through the openings 57 in the band 52 where it is thrown by centrifugal force to cool the end turns of the stator winding 7. The fluid from the end turns of the stator winding 7 in the antidrive end and from the bearing 26, drains by gravity into a reservoir 58 from which it is removed through channel 59 to the constant speed drive.

The fluid from the end turns of the stator winding on the drive end drains by gravity to the bottom of the housing 2 where it is sumped out by the constant speed drive. Thus, an improved fluid cooled machine is provided which has multiple heat paths. Heat from the rotor windings is conducted by the laminations to the rotor shaft where it is passed to the fluid flowing in the spiral groove. The outer edges of the rotor windings are cooled by the fluid flowing in the grooves in the inner wedge and the end turns of the rotor mounting are cooled by the fluid from the slingers flowing rapidly thereover. Also, in addition, to the stator coils being cooled by the fluid flowing in the parallel channels in the housing, the end turns are cooled by the fluid being sprayed upon them by centrifugal force.

Although only one embodiment of the invention has been illustrated and described, various changes in the form and relative arrangement of the parts, which will now appear to those skilled in the art, may be made without departing from the scope of the invention.

What is claimed is:

1. A liquid cooled generator comprising a housing, a rotor mounted in said housing, channels extending circumferentially in said housing, inlet means connecting said channels for supply a cooling fluid, a spiral channel in said rotor to circulate a cooling fluid therein, a stator winding mounted in said housing, rotor pole windings mounted in said rotor, wedges secured between said rotor pole windings, said wedges having channels therein, and means connecting with said spiral channel in said rotor for circulating a cooling fluid in said channels in said wedges.

2. The combination as set forth in claim 1 in which said rotor pole windings are mounted on a stack of laminations and said means for connecting said spiral channel to said channels in said wedges are channels through said laminations.

3. The combination as set forth in claim 1 and including a band for retaining said wedges in place, said band having a plurality of openings therein to permit cooling fluid to pass from said channels in said wedges to spray on said stator windings.

4. The combination as set forth in claim 1 in which said wedges are of a material having good heat conductivity.

5. The combination as set forth in claim 2 in which said wedges are aluminum and are insulated from said laminations and said windings by an anodic hard coat.

6. The combination as set forth in claim 1 and including means for draining cooling fluid from said housing.

7. The combination as set forth in claim 3 in which said stator winding is cooled by cooling fluid flowing in the channels in said housing and by cooling fluid sprayed upon them by centrifugal force.

8. The combination as set forth in claim 1 in which said rotor pole windings are cooled by cooling fluid flowing in said spiral channel in said rotor, by cooling fluid flowing in said channels in said wedges, and by cooling fluid flowing over the end turns of said windings.

References Cited

UNITED STATES PATENTS

| | | | |
|---|---|---|---|
| 1,691,696 | 11/1928 | Baum | 310—54 |
| 1,779,797 | 10/1930 | Baum | 310—54 |
| 2,130,843 | 9/1938 | Hill et al. | 310—194 |
| 2,654,037 | 9/1953 | Henter | 310—194 |
| 2,913,606 | 11/1959 | Guardiola. | |
| 2,974,239 | 3/1961 | Havelka et al. | 310—61 |
| 3,032,665 | 5/1962 | Wilhelmson | 310—54 |
| 3,260,872 | 7/1966 | Potter | 310—54 |

MILTON O. HIRSHFIELD, Primary Examiner

D. F. DUGGAN, Assistant Examiner

U.S. Cl. X.R.

310—61, 269